United States Patent [19]

Hudson et al.

[11] Patent Number: 6,059,973
[45] Date of Patent: May 9, 2000

[54] USE OF BIOAUGMENTATION AND A CONTROLLED RELEASE NITRATE SOURCE TO REDUCE HYDROGEN SULFIDE CONCENTRATIONS IN WASTEWATER SYSTEMS

[76] Inventors: Alice P. Hudson, 328 W. 11th St., Riviera Beach, Fla. 33404; Sasha J. Peggs, 3401 SW. 42 Ave., Palm City, Fla. 34990

[21] Appl. No.: 09/346,952

[22] Filed: Jul. 1, 1999

[51] Int. Cl.[7] .......................................... C02F 3/00
[52] U.S. Cl. .......................... 210/610; 210/916; 210/749; 210/611; 210/631
[58] Field of Search .................................. 210/916, 749, 210/610, 611, 631

[56] References Cited

U.S. PATENT DOCUMENTS

| | | | |
|---|---|---|---|
| 3,607,736 | 9/1971 | Miyaji | 210/11 |
| 4,911,843 | 3/1990 | Hunniford et al. | 210/610 |
| 5,114,587 | 5/1992 | Hägerstedt | 210/614 |
| 5,336,431 | 8/1994 | Richards et al. | 252/184 |
| 5,405,531 | 4/1995 | Hitzman et al. | 210/610 |
| 5,445,663 | 8/1995 | Carlsen et al. | 71/28 |
| 5,451,243 | 9/1995 | Ahlnäs | 71/64.09 |
| 5,512,079 | 4/1996 | Jahnke et al. | 71/64.08 |
| 5,518,517 | 5/1996 | Jahnke et al. | 71/64.08 |
| 5,578,211 | 11/1996 | Dickerson | 210/610 |
| 5,603,832 | 2/1997 | Høyuik et al. | 210/610 |
| 5,614,175 | 3/1997 | Winston et al. | 424/52 |
| 5,750,392 | 5/1998 | Hitzman et al. | 435/243 |
| 5,858,055 | 1/1999 | Jahnke et al. | 71/27 |
| 5,984,993 | 11/1999 | Mainz et al. | 210/758 |

*Primary Examiner*—David A. Simmons
*Assistant Examiner*—Chester T. Barry

[57] ABSTRACT

A method of reducing sulfide odors in wastewater collection and treatment systems. The method includes adding nitrate ions in the form of a controlled release composition and microbes to the wastewater effective to reduce hydrogen sulfide levels. The controlled release composition can be in the form of a water-in-oil emulsion. The microbes can be aerobic and facultative Bacillus species.

5 Claims, No Drawings

USE OF BIOAUGMENTATION AND A CONTROLLED RELEASE NITRATE SOURCE TO REDUCE HYDROGEN SULFIDE CONCENTRATIONS IN WASTEWATER SYSTEMS

FIELD OF THE INVENTION

This invention is directed to compositions and methods for the control of hydrogen sulfide concentrations in wastewater collection systems, which is accomplished by bioaugmentation using a metered addition of selected microbes, and a simultaneous metered addition of a controlled release nitrate source preferably in the form of a water-in-oil emulsion.

BACKGROUND OF THE INVENTION

Hydrogen sulfide and other odorous sulfide compounds result from the usage of sulfates and other compounds containing sulfur in anaerobic conditions by sulfate reducing bacteria (SRB) that are ubiquitous in wastewater collection and treatment systems. The problem is exacerbated by higher temperatures encountered in the summer and in more tropical climates. Hydrogen sulfide has an obnoxious characteristic rotten egg odor and is toxic even in low concentrations. It is also highly corrosive to metal and concrete components of wastewater collection and treatment systems. Because of its offensive odor and toxicity, regulatory restrictions on hydrogen sulfide emissions from wastewater collection and treatment systems and other emission sources are becoming more stringent.

The addition of oxidizing substances such as chlorine, hydrogen peroxide, ozone, oxygen, and potassium permanganate to wastewater collection and treatment systems to control hydrogen sulfide odors is common. These are typically metered into wastewater at points in the collection system that are upstream of sites where anaerobic conditions prevail, and they reduce the hydrogen sulfide concentrations by oxidizing the hydrogen sulfide, and by providing aerobic conditions to inactivate the SRB. These substances are very strong oxidants and effectively oxidize the hydrogen sulfide that is present, but are rapidly depleted through the oxidation of other components of the wastewater, and do not have a sustained effect. Any oxygen that may be released is used by the natural bacteria in the wastewater and is rapidly depleted. When the oxidant is depleted the system again becomes anaerobic, reactivating the SRB to again generate hydrogen sulfide which must be treated again by the oxidizing compounds.

The addition of nitrate ions to wastewater to control hydrogen sulfide odor is also common. Nitrate not only chemically oxidizes hydrogen sulfide but also provides a terminal electron acceptor for certain facultatively anaerobic bacteria present in wastewater to effectively compete with the SRB for the available energy and carbon sources, thus inhibiting the production of hydrogen sulfide. Nitrate also acts as an electron acceptor for certain other bacteria that oxidize hydrogen sulfide to sulfate or other benign oxidized forms of sulfur. For the addition of nitrate to be effective in controlling concentrations of hydrogen sulfide the nitrate must be present at adequate levels continuously in the collection and treatment system. This requires providing numerous addition points throughout the system to assure adequate levels.

It is also known to add certain selected bacteria to wastewater systems to effectively compete with the SRB for the available energy and carbon sources and thus effectively inhibit the production of hydrogen sulfide. To be effective these bacteria require a source of energy such as nitrate or nitrite, which is normally present in wastewater, but often becomes depleted due to bacterial activity, or events that alter the flow in the system.

In addition to controlling odor by decreasing the hydrogen sulfide concentration it is also desirable to decrease the biological oxygen demand (BOD), chemical oxygen demand (COD), total suspended solids (TSS) fats, oils, and greases of the wastewater in the collection system, before it reaches the treatment plant. This activity results in reduced foaming, scum formation and sludge volumes in the treatment plant.

Water in oil emulsions containing high concentrations of nitrate salts are well known, and are extensively used in explosives containing ammonium nitrate. Similar emulsions containing water soluble fertilizer materials including nitrates have been proposed as slow release fertilizers.

The object of this invention is to provide a method for the reduction of hydrogen sulfide concentrations in wastewater collection and treatment systems.

Another object is to provide for the addition of bacteria that rapidly and effectively metabolize the available carbon sources to prevent the activity of the SRB.

Another object is to provide a nitrate source to enhance the growth and metabolic activity of the added bacteria when oxygen is absent.

Another object is to provide a nitrate source to the naturally occurring bacteria in the wastewater that require nitrate during their metabolism in oxidizing hydrogen sulfide to sulfate, elemental sulfur and other forms of sulfur.

A further object is to provide for the slow release of the nitrate to assure its presence throughout the system with minimum dosages and addition points.

BRIEF DESCRIPTION OF THE INVENTION

The objectives of this invention are accomplished by the bioaugmentation of wastewater collection systems using a metered addition of optimized aerobic and facultative Bacillus species, and a simultaneous metered addition of a controlled release nitrate source preferably in the form of a water-in-oil emulsion.

DESCRIPTION OF THE PREFERRED EMBODIMENTS

The compositions and methods of this invention are designed to provide reduction in concentrations of hydrogen sulfide and in carbon compounds in wastewater collection and treatment systems through the metered addition of a specially designed mix of aerobic and facultative Bacillus species, together with a metered addition of a controlled release nitrate source preferably in the form of a water in oil emulsion.

The bacterial suspensions of this invention are preferably custom designed formulations of mixtures of species of Bacillus containing aerobic and facultative bacteria selected to metabolize a wide range of organic contaminants. Their use in wastewater collection systems reduces BOD, COD, TSS, petroleum hydrocarbons, proteins, fats and oils, and sludge production. They can be added to the wastewater system as dry powders or as liquid suspensions of vegetative cells, but they are most conveniently and preferably added as highly concentrated liquid suspensions of spores which become vegetative cells in the wastewater. The exact mixture of bacterial strains used and the levels at which they are added can be determined by routine laboratory evaluation using samples of the wastewater to be treated. The parameters to be considered include:

The safety of the strains chosen;

The desired results, such as the targeted reduction in hydrogen sulfide;

The "strength" of the wastewater, or the level of the targeted material to be removed that is present prior to treatment;

The source and composition of the wastewater;

The type of system being treated, such as force mains or gravity sewers;

The retention time of the wastewater to be treated; and

The method of dosing.

Typically the preferred range of activity of the added bacterial strains, measured as colony forming units (CFU) in the treated wastewater, is from about $1.0 \times 10^4$ to about $2 \times 10^7$ CFU/gallon, based on daily averages. The inoculated bacteria grow and metabolize, thus increasing in concentration with time in the treated wastewater system.

A number of soluble salts of nitric acid can be used to form the controlled release compositions of this invention. Examples are calcium nitrate, sodium nitrate, lithium nitrate, potassium nitrate, magnesium nitrate, ferric nitrate, and the like. Ammonium nitrate is less preferred because of the undesirability of introducing ammonia to the wastewater system, and also because of the potential for explosions if ammonium nitrate is improperly handled. Calcium nitrate is preferred because of its ready availability, high solubility, high available nitrate content, and safety in handling. Fertilizer grade calcium nitrate typically contains about 14.5% by weight nitrate N and in addition contains about 1% by weight ammonium nitrogen.

The controlled release nitrate may be added in any form that provides for its controlled release, such as encapsulated particles, but is preferably added as a water-in-oil emulsion in which the discontinuous water phase is a concentrated solution of the nitrate salt and the oil phase is a mineral or animal or vegetable oil or derivative thereof A large number of emulsifiers have been disclosed for use in explosive and similar emulsions and any of these that are capable of forming emulsions that are stable and pumpable at nitrate ion concentrations of greater than about 25% by weight can be used to prepare the emulsions of this invention. These emulsifiers are disclosed in, among others, U.S. Pat. Nos. 4,356,044; 4,500,370; 4,141,767; 4,357,184; 4,615,751; incorporated herein by reference. Specific examples of emulsifiers include sorbitan fatty acid esters, glyceryl esters, glycol esters, substituted oxazolines, alkyl amines and salts thereof, unsaturated fatty acid salts, lecithin, alkyl benzene sulfonates, oleic acid phosphate, and decaglycerol decaoleate.

Preferred are emulsifiers which are hydrocarbyl substituted succinic anhydride derivatives described in U.S. Pat. Nos. 4,708,753; 5,512,079; 5,518,517; and 5,858,005 and incorporated herein by reference. Particularly preferred emulsifiers are polyisobutylene succinic anhydride derivatives with polyalkylene polyamines.

Any oil that is capable of forming emulsions that are stable and pumpable at nitrate ion concentrations of greater than 25% by weight can be used to prepare the emulsions. Lower viscosity oils in general make lower viscosity emulsions and are preferred. Paraffinic oils with viscosities of less than about 600 SUS and preferably less than about 100 SUS are highly suitable. Animal and vegetable derived oils, which are more readily biodegradable than mineral oils are preferred. Particularly preferred is methyl soyate, which is derived from soybean oil. The emulsions can be prepared by standard methods of the art, as disclosed in U.S. Pat. Nos. 4,708,753; 5,512,079; 5,518,517; and 5,858,005. The aqueous phase typically contains nitrate salt concentrations from about 40% to about 80% by weight, and the aqueous phase typically constitutes from about 75 to about 95% by weight of the total composition. The concentration of nitrate ion in the emulsions is greater than about 25% by weight, and preferably greater than about 40% by weight. The viscosity of the emulsion is dependent on the structure of the emulsifier and the level of its use, the structure and viscosity of the oil, and the ratio of the aqueous phase to the oil phase. Typically the emulsifier constitutes from about 5 to about 25% by weight of the oil phase, the oil phase constitutes from about 5 to about 25% by weight of the total composition. The Brookfield viscosity of the emulsions must be low enough so that it can be readily metered at the point of use. When measured with a # 4 spindle at 6 rpm, the viscosity should be less than about 75,000 centipoise, and preferably less than about 50,000 centipoise.

The bacteria and the controlled release nitrate can be added to the wastewater system by any means that assures their presence and activity at adequate levels to reduce hydrogen sulfide concentrations to acceptable levels in the system. They are typically added upstream from areas where anaerobic conditions prevail and hydrogen sulfide concentrations would build up if no treatment were used. They can be added continuously or can be added in metered doses at intervals and in amounts that assure their continuous presence and activity. Typically the bacteria are added in quantities such that they are present at levels of at least about $1 \times 10^4$ CFU/gallon, and the nitrate is added in quantities such that it is adequate to oxidize the sulfide concentrations present as determined by the flow rate of the system and the sulfide present in the untreated system. This typically requires about 2.4 parts of nitrate ion for 1 part of hydrogen sulfide.

The following examples further illustrate the invention. As used herein all parts or percentages are parts or percentages by weight unless otherwise indicated.

EXAMPLE 1

A w/o emulsion was prepared as follows:

288 g of fertilizer grade calcium ammonium nitrate containing 14.5% nitrate N and 1.0% ammonium N was dissolved in 72 g of water at 60° C. The oil phase was prepared by dispersing 4.8 g of LZ 2727 from Lubrizol Corporation, Wickliffe, Ohio in 35.2 g of methyl soyate at 60° C. LZ 2727 is a 45% solution in mineral oil of a reaction product of polyisobutylene succinic anhydride and a polyalkylene polyamine. Mixing with a propeller blade stirrer, the calcium nitrate solution was added slowly to the oil phase starting with small increments, over a period of 20 minutes. After the addition was completed the emulsion was mixed at high shear for 2 minutes. The resulting emulsion had a Brookfield viscosity of 15,000 centipoise measured with spindle # 4 at 6 rpm. It was stable for >5 weeks stored at 50° C. Droplets placed in water did not disperse on standing, and nitrate was released to the exterior water phase very slowly.

EXAMPLE 2

A w/o emulsion was prepared as follows:

64.8 g of fertilizer grade calcium ammonium nitrate was dissolved in 25.2 g of water at 25° C. The oil phase was prepared by dispersing 0.89 g of LZ 2727 in 9.1 g of 100 SUS paraffinic oil. The calcium nitrate solution was added slowly to the oil phase with vigorous stirring over a period of 20 minutes. When the addition was complete the emulsion was mixed at high shear for 2 minutes. The resulting emulsion had a Brookfield viscosity of 56,000 centipoise measured with spindle # 4 at 6 rpm. Droplets placed in water did not disperse on standing, and nitrate was released to the exterior water phase very slowly.

EXAMPLE 3

A w/o emulsion was prepared as follows:

64.3 g of fertilizer grade calcium ammonium nitrate was dissolved in 25.7 g of a 67% solution of magnesium nitrate hexahydrate at 80° C. The oil phase was prepared by dispersing 2 g of LZ 2727 in 8 g of methyl soyate. The mixed calcium and magnesium nitrate solution was added slowly to the oil phase over about 20 minutes. When the addition was complete the emulsion was mixed at high shear for 2 minutes. The resulting emulsion was a soft paste.

EXAMPLE 4

Emulsions were prepared at 25° C. using 90 parts of 72% by weight fertilizer grade calcium ammonium nitrate as the water phase. The oil phase consisted of 8.8 parts of methyl soyate and 1.2 parts of the emulsifiers listed in Table 1. The resulting emulsions are described in Table 1.

TABLE 1

| Emulsifier | Emulsion |
| --- | --- |
| Sorbitan monooleate | Stable gel, viscosity > 50,000 cps |
| Glyeryl monooleate | Stable gel, viscosity > 50,000 cps |
| Tallow amine acetate | Stable gel, viscosity > 100,000 cps |
| Lecithin | Stable, viscosity = 35,000 cps |

EXAMPLE 5

In a field test, approximately 300,000 gallons per day of wastewater in a 4.5 mile long force main was treated with bioaugmentation and slow-release nitrate introduction. Two programmable peristaltic pumps located at a lift station at the end of the force main were used to inoculate the wastewater with a mixed culture of 5 Bacillus species at a concentration of $1 \times 10^9$ CFU/ml. The culture was inoculated at a rate of 1 gallon per week, on an hourly schedule. The calcium nitrate emulsion of Example 1 was dosed at a rate of 2.65 gallons per day on an hourly schedule. Samples were taken daily in the morning at the end of the opposite end of the force main. The initial sulfide concentration of the wastewater before treatment varied between 12 and 15 ppm, and the temperature of the wastewater was 25–26° C. Initially the bacterial suspension was dosed exclusively for a period of 10 days the sulfide concentration dropped to 8 to 10 ppm. When both the bacterial suspension and the calcium nitrate emulsion were dosed together for a period of 10 days, the sulfide concentration dropped to 5 to 6 ppm. When the calcium nitrate emulsion was dosed exclusively for a period of 10 days, the sulfide concentration increased to 10 to 12 ppm. The wastewater temperature increased to 27–29° C. over the course of the experiment. In untreated wastewater, an increase in temperature results in a corresponding increase in sulfide concentration.

The invention can be embodied in other forms without departing from the spirit or essential attributes thereof. Particularly it will be appreciated by those skilled in the art that alternative methods of addition to those disclosed could have utility in the invention. Reference should therefore be had to the following claims, rather than to the foregoing specification to determine the scope of the invention.

We claim:

1. A method of reducing sulfide odors in wastewater collection and treatment systems which comprises the steps of:
   a. adding selected microbes such that a population effective to reduce hydrogen sulfide levels is maintained; and
   b. adding nitrate ions in the form of a controlled release composition such that a concentration effective to reduce hydrogen sulfide levels is maintained.

2. The method of claim 1 wherein the selected microbes are aerobic and facultative Bacillus species.

3. The method of claim 1 wherein the composition is in the form of a water-in-oil emulsion.

4. The method of claim 3 wherein the water-in-oil emulsion contains an emulsifier comprising hydrocarbyl substituted succinic anhydride derivatives.

5. The method of claim 3 wherein the water-in-oil emulsion comprises vegetable oils and derivatives thereof.

* * * * *